United States Patent [19]
Sabo

[11] 3,782,630
[45] Jan. 1, 1974

[54] SPRINKLER CONTROL SYSTEM
[76] Inventor: William V. Sabo, 144 N. Sylvan Ave., Columbus, Ohio 43204
[22] Filed: May 30, 1972
[21] Appl. No.: 257,526

[52] U.S. Cl. .................................. 239/70, 239/206
[51] Int. Cl. ............................................. B05b 3/06
[58] Field of Search ................ 239/67, 69, 70, 201, 239/204, 206

[56] References Cited
UNITED STATES PATENTS

| | | | |
|---|---|---|---|
| 3,440,434 | 4/1969 | Yates et al. | 239/70 X |
| 2,668,078 | 2/1954 | Snoddy | 239/204 |
| 2,013,849 | 9/1935 | Keys | 239/206 |
| 3,662,956 | 5/1972 | Hedman | 239/201 |
| 3,118,606 | 1/1964 | Rotunda | 239/70 X |
| 3,140,720 | 7/1964 | Griswold | 239/70 UX |
| 3,297,254 | 1/1967 | Coffman | 239/70 X |
| 3,669,352 | 6/1972 | Zaphiris | 239/70 |

Primary Examiner—Allen N. Knowles
Assistant Examiner—Michael Y. Mar
Attorney—Harvey B. Jacobson

[57] ABSTRACT

A plurality of irrigation sprinklers are sequentially operated for timed intervals by an electrical control system having a timing mechanism through which valve solenoids are energized. Selected solenoid circuits are opened by eliminator switches to bypass desired sprinkler locations during timed irrigation cycles. Through a locator panel portion, the sprinklers in operation are identified and the operating period of desired sprinklers extended beyond the time interval.

8 Claims, 5 Drawing Figures

SPRINKLER CONTROL SYSTEM

This invention relates to irrigation apparatus and controls and more particularly to a plurality of fixedly anchored sprinkler devices and an electrical control system therefor.

Automatic irrigation control systems in which a plurality of sprinkler devices are sequentially operated, are well known. Generally, such irrigation systems require special sprinkler devices and equipment located adjacent thereto for proper operation. Such systems are designed to operate under special conditions and to meet certain specific irrigation requirements. As a result, such systems are relatively complex and expensive to both manufacture and install and are not of course suitable for relatively small areas which nevertheless require some sort of automatic irrigation control. It is therefore an important object of the present invention to provide an irrigation control system which is relatively inexpensive to manufacture and install as well as simple to operate. Further, it is an additional object of the present invention to provide an irrigation control system capable of being utilized with pop-up types of rotating sprinklers which have been widely accepted for use.

In accordance with the present invention, the pop-up type of rotating sprinkler devices aforementioned, are connected by conduits to control equipment located entirely behind the foundation wall of an enclosure to which the water supply is connected. The control equipment includes solenoid operated valve devices for each of the sprinklers which are designed so as to be vertically retracted when not in use and entirely removed during winter months. The sprinkler devices are set into operation during a manually set irrigation cycle during which sequential energization of the associated solenoid operated valves occurs for predetermined timing intervals. The control equipment is provided with a panel on which each of the sprinkler devices is identified by location indicating lamps. These lamps are illuminated during the operating period of associated sprinklers. A manual locator control is provided and is capable of being positioned so as to point to a desired locator lamp in order to set a corresponding sprinkler device into operation at the beginning of a timing cycle initiated by a start switch. Any desired sprinkler may be disabled without affecting the operation of the timing mechanism in order to bypass desired areas otherwise subject to irrigation. Also, through a mode selection switch, any desired sprinkler may be maintained in operation for the duration of the timing cycle in order to extend its operating period. Thus, certain areas where irrigation is not desired or areas where additional irrigation is required, may be accommodated. All of the foregoing objectives are accomplished by relatively simple switch controls having indicator lamps by means of which operation of the system may be readily monitored at all times.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
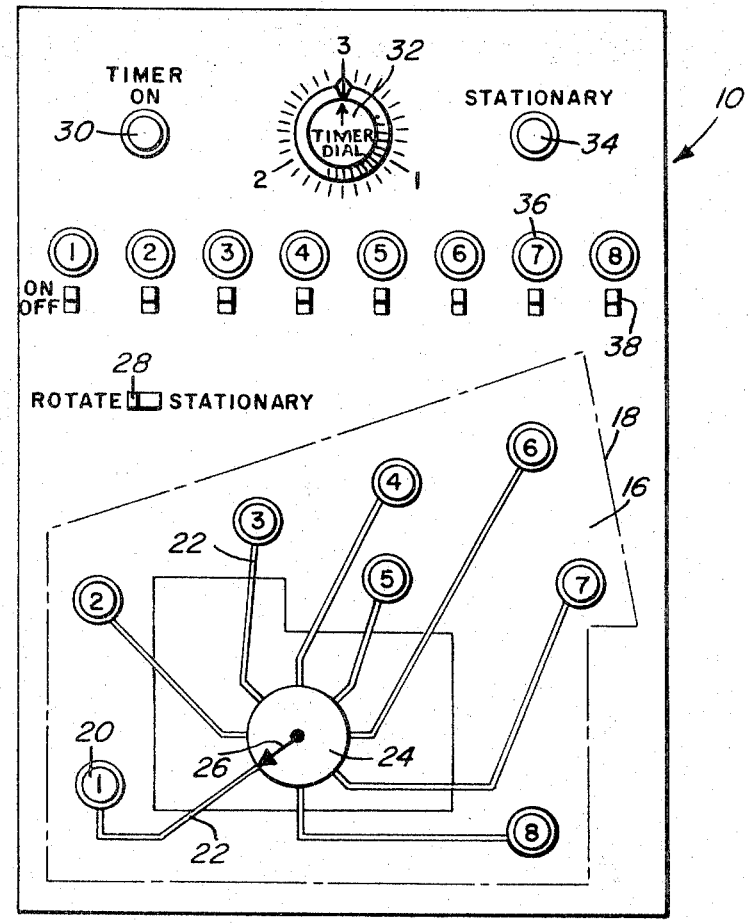
FIG. 1 is a front elevational view of a typical control panel associated with the present invention.
Figure 3:
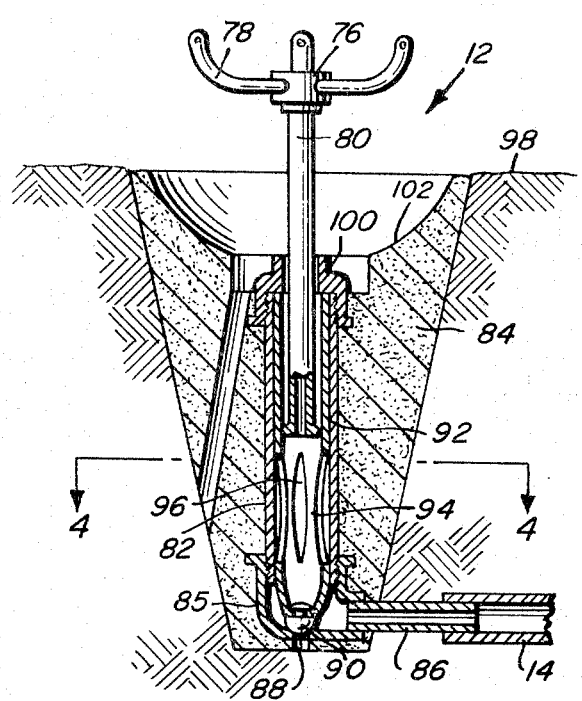
FIG. 3 is a side sectional view through one of the sprinkler devices associated with the apparatus of the present invention.
Figure 4:
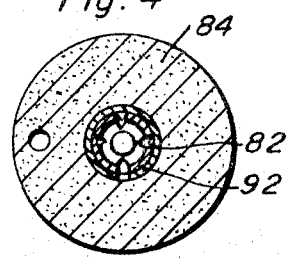
FIG. 4 is a transverse sectional view taken substantially through a plane indicated by section line 4—4 in FIG. 3.

Referring now to the drawings in detail, FIG. 1 illustrates a control panel generally denoted by reference numeral 10 behind which an electrical control system is mounted for controlling operation of a plurality of sprinkler devices such as the pop-up type of sprinkler device 12 illustrated in FIG. 3. Accordingly, water under pressure from a suitable source is supplied through solenoid operated valves to each of the sprinkler devices 12 by means of underground conduits 14. Thus, the sprinkler devices are connected through the supply conduits 14 to the controls all of which may be mounted behind the foundation wall of a building so that no control equipment will be exposed externally of the protective enclosure of such building.

Referring now to FIG. 1, the lower portion of the control panel 10 has an area 16 enclosed by a bordering outline 18 representing a geographic region irrigated by a plurality of sprinkler devices 12. Each location of the sprinkler devices in the region represented by the area 16, is identified by a sprinkler location indicator 20 such as a numeral illuminating lamp. In the illustrated embodiment, the location of eight sprinkler devices is indicated by the lamps 20. Thus, the lamps 20 are located within the area 16 in surrounding relation to an outline representing for example a building of corresponding location and size relative to the region represented by the area 16. Each of the lamps 20 representing the locations of the sprinkler devices, are connected by lines 22 on the panel surface to the peripheral rim of a rotatable control knob 24 on which a pointer 26 is mounted. The control knob 24 may therefore be manually rotated to a desired position with the indicator pointing to one of the sprinkler location identifying lamps 20 so that operation of a timing cycle will begin with operation of the associated sprinkler. The sprinklers will be operated sequentially for timed intervals. As each sprinkler shuts down and the next sprinkler begins operation, the control knob 24 is angularly advanced in a clockwise direction, for example, so that the pointer 26 will indicate which of the sprinklers is in operation. The lamp 20 to which the pointer 26 is pointing is also illuminated during operation of the corresponding sprinkler. Thus, the locator control knob 24 will return to its initial position at the end of an irrigation cycle after the pointer has stopped at each of the sprinkler locating positions for a timed interval.

Sequential operation of the sprinkler devices 12 is effected through the control system by positioning a mode selection switch 28 on the control panel to a rotate position. The irrigation cycle may then be initiated by manually setting the timer through control dial 32. Accordingly, the timing cycle in the illustrated embodiment may be set for one, two or three hours. In order to initiate a timing cycle, the timer control knob 32 is advanced clockwise from its illustrated position in FIG. 1 to begin a timing cycle corresponding to the position to which it is advanced. When advanced from its illustrated position, turning on the timer, the indicator lamp 30 is illuminated to signify timer operation.

As hereinbefore indicated, during timed operation of the control system, each of the sprinkler devices will be operated for an interval of predetermined duration. However, the operating period for any desired sprinkler may be extended for the remainder of the timing cycle by displacing the mode selection switch 28 to the stationary position. The sprinkler device in operation at the time will accordingly remain in operation until the timed cycle is completed. During this mode of operation, an indicator lamp 34 is illuminated. Thus, any portion of the region represented by area 16 may be watered for an extended period of time.

If there are any portions of the region represented by area 16 which do not require irrigation, the sprinkler located in this portion may be bypassed during the timed cycle. Toward this end, a plurality of numeral illuminating lamps 36 are provided on the control panel with an on-off toggle switch 38 located therebelow. Each switch 38 has an on-and-off position. Thus, any one of the sprinkler devices represented by one of the lamps 36 may be bypassed by merely displacing its associated switch 38 to its off position. When any of the switches 36 is switched to the off position, its associated lamp 36 will be illuminated so as to indicate that the corresponding sprinkler device will not be operated during the irrigation cycle.

Figure 5:
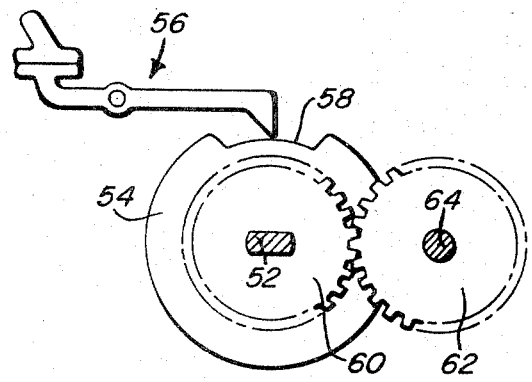
FIG. 5 is a side sectional view through a portion of the timing mechanism associated with the apparatus of the present invention.
Figure 2:
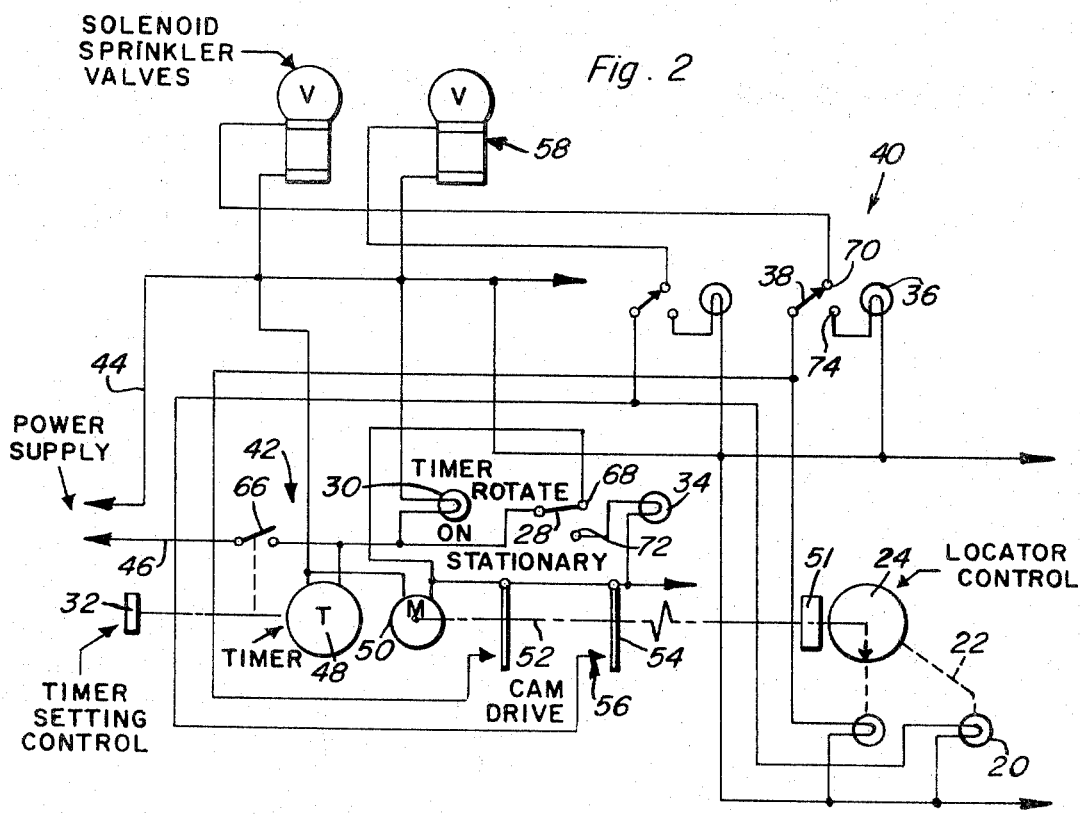
FIG. 2 is an electrical circuit diagram corresponding to the control system of the present invention.

Referring now to FIG. 2 illustrating the control system generally referred to by reference numeral 40, the timer mechanism denoted by reference numeral 42 is connected to a source of electrical energy through power lines 44 and 46. The timer mechanism is of any suitable well known type including a timer motor 48. A cam motor 50 is drivingly connected to a camshaft 52 as schematically illustrated in FIG. 2. The camshaft 52 has mounted thereon a plurality of similar cams 54 which are angularly spaced from each other and correspond to each of the sprinkler devices being controlled by the control system. A cam switch 56 is associated with each cam in order to control energization of a corresponding solenoid operated valve device 58 through which water under pressure is admitted from the source to an associated sprinkler device. As more clearly seen in FIG. 5, each of the cams 54 may be mounted on the camshaft so that a peripheral recess 58 thereon controls the opening and closing of an associated cam switch 56. Further, the camshaft 52 may be geared through gearing 60 and 62 to the control shaft 64 to which the locator control knob 24 is connected by a one-way clutch 51 as diagrammatically shown in FIG. 2. Thus, through rotation of the control knob 24 in one direction, the cams may be initially positioned while the cam motor 50 is deenergized in order to start operation with any desired sprinkler device.

When the timer control knob 32 is manually displaced to a desired setting, the timer start switch 66 is closed as shown in FIG. 2 in order to connect the timer motor 48 across the power lines 44 and 46. With the mode selection switch 28 in the rotate position engaging contact 68, a circuit is also completed through the cam motor 50 so as to drive the camshaft 52 in order to effect sequential actuation of the switches 56. Also, since the lamp 30 is connected in parallel with the timer motor 48, it will remain illuminated during operation of the timer mechanism. Assuming that the eliminator switches 38 are in the on positions as illustrated in FIG. 2, engaging the contacts 70, whenever a corresponding cam actuated switch 56 is closed, a circuit is completed through that cam switch in series with the associated switch 38 through an associated solenoid valve 58 connected between the contacts 70 and the power line 44. The cam actuated switches 56 are also connected to associated indicator lamps 20 in order to complete a circuit therethrough when closed to thereby signify energization of an associated solenoid valve 58 and operation of a corresponding sprinkler device.

When the mode selection switch 28 is displaced from the "rotate" position to the other "stationary" position engaging contact 72, during the irrigation cycle, a circuit is completed through the indicator lamp 34 in series with the closed cam switch 56, the associated switch 38 and associated solenoid valve 58. Thus, this solenoid valve and lamp 34 remain energized for the duration of the timing cycle since the circuit through the cam motor 50 is opened thereby interrupting the drive for camshaft 52. The corresponding sprinkler device will therefore remain in operation for the remainder of the timing cycle terminated by opening of switch 66 by the timer motor 48.

By displacing one of the switches 38 to its other operative position engaging the contact 74, only the circuit through the solenoid valve is opened, the control circuit then being completed through the associated indicator lamp 36 to signify that the corresponding sprinkler device is being bypassed or eliminated.

As hereinbefore indicated, the sprinkler devices 12 are of the pop-up type in that they include a sprinkler head 76 from which three jet type spray arms 78 extend to discharge water and cause rotation of the head mounted on a vertically slidable tubular stem 80 that projects into a vertical conduit or standpipe 82 anchored in the ground by a concrete body 84. The lower end portion of the conduit 82 is connected by means of an elbow 85 to a connector section 86 received within the water supply conduit 14. A drain opening 88 is formed at the bottom of the elbow 84 adapted to be sealed by a compressed rubber plug 90 at the lower end of a rigid sleeve 92 lining the interior of the conduit 82. The sleeve 90 includes a downwardly converging portion 94 mounting the plug 90 at its lower end and provided with circumferentially spaced slits 96. Thus, when water under pressure is supplied to the sprinkler device, it will elevate the sprinkler head 76 through its stem 80 which also conducts the water for discharge through the spray arms 78 causing rotation of the head. The sprinkler head is raised from its rest position on a concave surface 102 formed as a recess in the top of the concrete anchor body 84 so that the sprinkler head will be disposed wholly therein or below ground level 98 when not in use. In its rest position, the sprinkler head 76 will also seal the top of the end cap 100 exposed within a central lower recess forming a shelf with the surface 102 and through which the stem 80 projects. Any water collected within the sprinkler device when not in use may of course be drained through the drain opening 88 by removal of the cap 100 to relieve the pressure exerted on the plug 90 by the sleeve 92 which is dimensioned to project slightly above the upper end of conduit 82 in the undeformed state of plug 90. Further, during winter months, the sprinkler head, the cap 100 and sleeve 92 with plug 90 may be removed and the conduit 82 capped at the upper end.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a plurality of irrigation sprinklers at spaced locations to which fluid is supplied through solenoid-operated valves from a source of fluid under pressure, a control system comprising a power source of electrical energy, a control mechanism having switches electrically connecting said solenoid-operated valves to the power source and drive means for actuating said switches to sequentially open the solenoid-operated valves during spaced intervals within a timing cycle, locator means operatively connected to the control mechanism for identifying the sprinklers from which fluid is being discharged during each of said intervals, and selectively controlled means for disabling selected solenoid-operated valves during the timing cycle without affecting operation of the control mechanism, each of said sprinklers including a vertical flow conduit having a lower pressure sealed drain portion connected to an associated one of said valves and an upper end portion, a rotatable sprinkler head having a tubular stem slidably mounted within the upper end portion of the flow conduit, and concrete anchoring means for the flow conduit having an upper concave rest surface receiving the sprinkler head below ground level.

2. In combination with a plurality of irrigation sprinklers at spaced locations to which fluid is supplied through solenoid-operated valves from a source of fluid under pressure, a control mechanism connected to said solenoid-operated valves for selecting the sprinklers from which fluid is discharged, and locator means operatively connected to the control mechanism for identifying the sprinklers from which the fluid is being discharged comprising a panel, a plurality of indicator lamps mounted on the panel at locations geometrically corresponding to said locations of the sprinklers, pointer means rotatably mounted on the panel for movement to positions pointing to said indicator lamps, and means drivingly connecting the pointer means to the control mechanism for actuating corresponding valves in each of said positions of the pointer means.

3. The combination of claim 2 wherein said pointer means comprises a control knob mounted on the panel, and a plurality of lead lines formed on the panel extending between the indicator lamps and a circular periphery about the control knob.

4. An irrigation sprinkler device adapted to be connected to a source of liquid under pressure through a valve comprising a vertical flow conduit having a lower pressure sealed drain portion connected to said valve and an upper end portion, a rotatable sprinkler head having a tubular stem slidably mounted within the upper end portion of the flow conduit, and concrete anchoring means for the flow conduit having an upper concave rest surface receiving the sprinkler head below ground level.

5. The combination of claim 4 including a sleeve internally lining said flow conduit having a tapering portion converging downwardly toward a lower end, a seal plug mounted on the lower end in engagement with the drain portion of the conduit, said sleeve being provided with circumferentially spaced slits.

6. In combination with a sprinkler head, a rigid body having horizontal top and bottom surfaces interconnected by a side surface, said top surface having a centrally disposed recess extending downwardly therefrom and adapted to receive the sprinkler head wholly therein and including a formation which prevents substantial downward displacement of said head relative to said body, said body further defining an aperture adjacent the bottom surface adapted to receive a sprinkler connector and a generally centrally disposed, generally vertical passageway communicating with said aperture and said recess and adapted to receive a standpipe interconnecting said connector and said sprinkler head.

7. The combination of claim 6 wherein said formation comprises a generally cylindrical shelf adjacent a bottom end of the recess adapted to support the sprinkler head when depressed into the recess.

8. The combination of claim 6 wherein said body is frustoconical and fabricated of cast cementitious material.

* * * * *